(12) United States Patent
Lubenow et al.

(10) Patent No.: US 8,876,039 B2
(45) Date of Patent: Nov. 4, 2014

(54) FOLDING WING FOR AIRCRAFT

(75) Inventors: Jacob G. Lubenow, Seattle, WA (US);
Andrew S. McComas, Banbridge, WA (US); Jeremy A. Zanzig, Redwood, WA (US); Jeffrey A. Gerhart, Kent, WA (US); Alan R. Klug, Seattle, WA (US); Jonathan P. Clark, Kirkland, WA (US)

(73) Assignee: Stark Aerospace, Inc., Redmond, WA (US)

( * ) Notice: Subject to any disclaimer, the term of this patent is extended or adjusted under 35 U.S.C. 154(b) by 169 days.

(21) Appl. No.: 13/462,422

(22) Filed: May 2, 2012

(65) Prior Publication Data

US 2012/0280080 A1    Nov. 8, 2012

Related U.S. Application Data

(60) Provisional application No. 61/481,980, filed on May 3, 2011, provisional application No. 61/511,688, filed on Jul. 26, 2011, provisional application No. 61/511,706, filed on Jul. 26, 2011.

(51) Int. Cl.
*B64C 3/56* (2006.01)

(52) U.S. Cl.
USPC .......................................... 244/49; 244/3.28

(58) Field of Classification Search
USPC ........ 244/3.28, 38, 39, 46, 49; 446/35, 62, 66
See application file for complete search history.

(56) References Cited

U.S. PATENT DOCUMENTS 2,539,489 A  *  1/1951  Smith ............................... 244/2
5,118,052 A  *  6/1992  Alvarez Calderon F ........ 244/49

OTHER PUBLICATIONS

Switchblade™ LMAMS product description—(4 pages).
Maveric™ Product Description—(15 pages).
Switchblade™ LMAMS product description 2011—(5 pages).
Maveric™ Product Description 2011—(21 pages).
Maveric™ photos 2011—(59 pages).

* cited by examiner

*Primary Examiner* — Brian M O'Hara
(74) *Attorney, Agent, or Firm* — Finnegan, Henderson, Farabow, Garrett & Dunner, LLP

(57) ABSTRACT

A folding wing for an aircraft comprises first and second inboard wing sections, and first and second outboard wing sections. The first and second inboard wing sections rotate about a centerline hinge, and a centerline spring applies force to the first and second inboard wing sections to rotate the first and second inboard wing sections from a stowed position to a deployed position. At least one of the first and second inboard wing sections translates along the axis of rotation of the first and second inboard wing sections as they move from the stowed to the deployed positions. The first and second outboard wing sections rotate between the stowed and the deployed positions about first and second outboard hinges.

11 Claims, 9 Drawing Sheets

FOLDING WING FOR AIRCRAFT

CROSS-REFERENCE TO RELATED APPLICATION

This application claims the benefit of U.S. Provisional Patent Application Nos. 61/481,980, filed May 3, 2011; 61/511,688, filed Jul. 26, 2011; and 61/511,706, filed Jul. 26, 2011, the disclosures of each of which are hereby expressly incorporated by reference in their entirety.

TECHNICAL FIELD

The present disclosure relates generally to the field of aeronautics, and more particularly to collapsible or folding aircraft wings.

BACKGROUND

Most aircraft feature wings, which are fixed in place and incapable of being stowed or folded. This limitation prevents aircraft from being stored in small spaces or launched out of containers, such as tubes, and subsequently unfurled into flight configuration. Presently, unmanned aerial vehicles (UAVs), which are often smaller than conventional aircraft and can sometimes be hand-carried, are increasingly employed for remote sensing in commercial and industrial applications. UAVs would benefit from additional systems and methods to increase their ability to be compactly stored and launched.

Some existing designs for folding wings utilize flexible wing materials and airfoil shapes. However, such designs may decrease aerodynamic performance and otherwise be structurally deficient. Other existing designs incorporate a large number of individual components, which may result in increased cost and complexity, and reduced reliability. Still other designs employ a single spring-loaded hinge attached to single-section wing halves, which can only deploy a wing with relatively low span, thus increasing drag and decreasing aircraft performance and endurance.

The systems and methods disclosed herein address one or more of the problems set forth above and/or other problems of existing designs.

SUMMARY

In the following description, certain aspects and embodiments of the present invention will become evident. It should be understood that the invention, in its broadest sense, could be practiced without having one or more features of these aspects and embodiments. In other words, these aspects and embodiments are merely exemplary.

In one aspect, the invention provides a foldable wing for an aircraft. The wing comprises a mounting member mountable on a fuselage of the aircraft and having a mount axis, first and second inboard wing sections, first and second outboard wing sections, and a centerline hinge assembly. The centerline hinge assembly comprises first and second centerline hinge members, the first and second centerline hinge members being coupled to the mounting member, respectively connected to the first and second inboard wing sections, and movable in rotation about the mount axis and in translation along the mount axis, between stowed and deployed inboard wing section positions, with at least one of the first or second centerline hinge members being translationally moveable along the mount axis. The centerline hinge assembly also comprises a centerline bias member applying rotational force to the first and second centerline hinge members and translational force to at least one of the first or second centerline hinge members, to bias the first and second centerline hinge members from the stowed inboard wing section position toward the deployed inboard wing section position. The wing also comprises first and second wing hinge assemblies respectively comprising first and second inboard hinge members respectively connected to the first and second inboard wing sections, and first and second outboard hinge members, the first and second outboard hinge members being respectively connected to the first and second outboard wing sections, respectively coupled to the first and second inboard hinge members, and rotatably moveable about respective first and second wing axes between stowed and deployed outboard wing section positions, with at least one of the first or second inboard or outboard hinge members being translationally moveable along the wing axes. The wing also comprises first and second wing bias members, the first and second wing bias members being respectively coupled to the first and second inboard hinge members and to the first and second outboard hinge members, and respectively applying, to the first and second inboard and outboard hinge members, rotational and translational force to bias the first and second outboard hinge members from the stowed outboard wing section position toward the deployed outboard wing section position.

In another aspect the invention provides hinge apparatus for an aircraft with a foldable wing. The apparatus comprises a first hinge member. The first hinge member comprises a first connection section connected to a first portion of the wing and a first mating section and rotatable about the axis. The apparatus also comprises a second hinge member, the second hinge member comprising a second connection section connected to a second portion of the wing and a second mating section coupled to the first mating section and movable, in rotation about an axis and in translation along the axis, between stowed and deployed positions. The apparatus also comprises a bias member applying rotational and translational force on the second hinge member, to bias the second hinge member from the stowed position toward the deployed position.

In yet another aspect, the invention provides hinge apparatus for a folding wing. The apparatus comprises inboard and outboard hinge members, the inboard and outboard hinge members being respectively connectable to associated inboard and outboard wing sections, being coupled together, and being rotatably moveable about an axis between stowed and deployed wing positions. In the apparatus, at least one of the inboard and outboard hinge members is translationally moveable along the axis between the stowed and the deployed positions. The apparatus also comprises a bias member coupled to the inboard and outboard hinge members and applying rotational and translational force to bias the inboard and outboard hinge members from the stowed wing position toward the deployed wing position.

Aside from the arrangements set forth above, the invention may include a number of other arrangements, such as those explained hereinafter. It is to be understood that both the foregoing description and the following description are exemplary only.

BRIEF DESCRIPTION OF THE DRAWINGS

The accompanying drawings are incorporated in and constitute a part of this specification. The drawings illustrate exemplary embodiments and, together with the description, serve to explain some principles of the invention. In the drawings.

DETAILED DESCRIPTION

Figure 1:
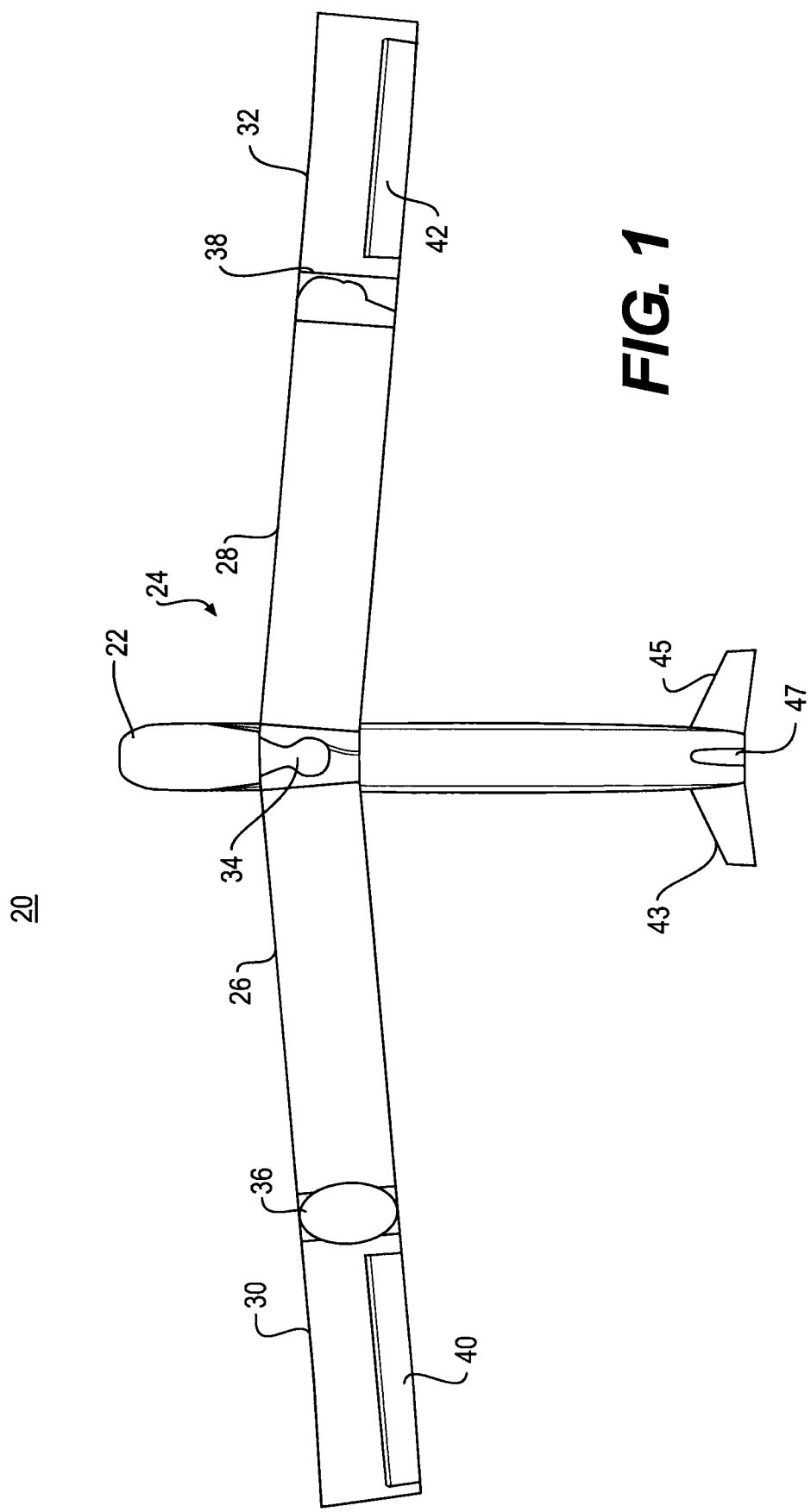
FIG. 1 is a top view of an exemplary aircraft including a folding wing shown in a deployed position, consistent with embodiments of the present invention.

Reference will now be made in detail to a few exemplary embodiments of the invention. Wherever possible, the same reference numbers are used in the drawings and the description to refer to the same or like parts.

FIG. 1 shows portions of an aircraft 20, including a fuselage 22 and a wing 24. Wing 24 is a folding wing, and is shown in FIG. 1 in a fully deployed position. Wing 24 includes left and right inboard wing sections 26, 28, and left and right outboard wing sections 30, 32. Wing 24 is mounted to fuselage 22 by a centerline hinge 34. Connecting the inboard and outboard wing sections are left and right outboard wing hinges 36, 38. Additional outboard hinges and wing sections may be included in alternate embodiments to provide increased wingspan. Outboard wing sections 30, 32 may include control surfaces 40, 42, respectively. In certain applications, inboard wing sections 26, 28 may also include control surfaces, not shown in FIG. 1. Aircraft 20 may also include horizontal and vertical tail sections 43, 45 and 47. Left and right inboard and outboard wing sections 26, 28, 30, and 32 may be of rigid construction.

Figure 2:
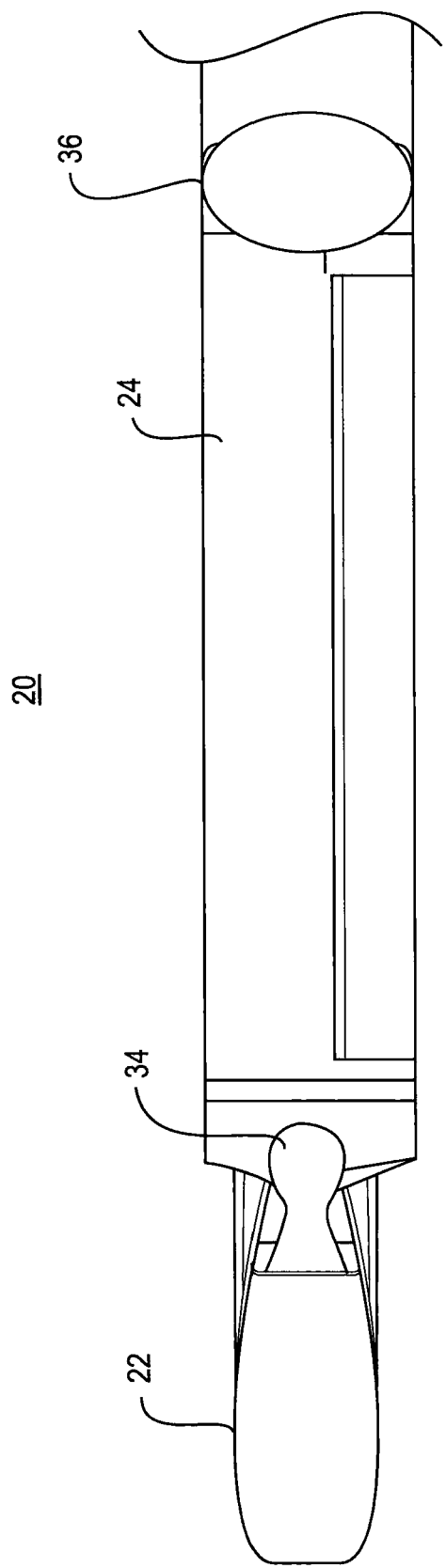
FIG. 2 is a top view of the aircraft of FIG. 1, with the wing shown in a stowed position.
Figure 3:
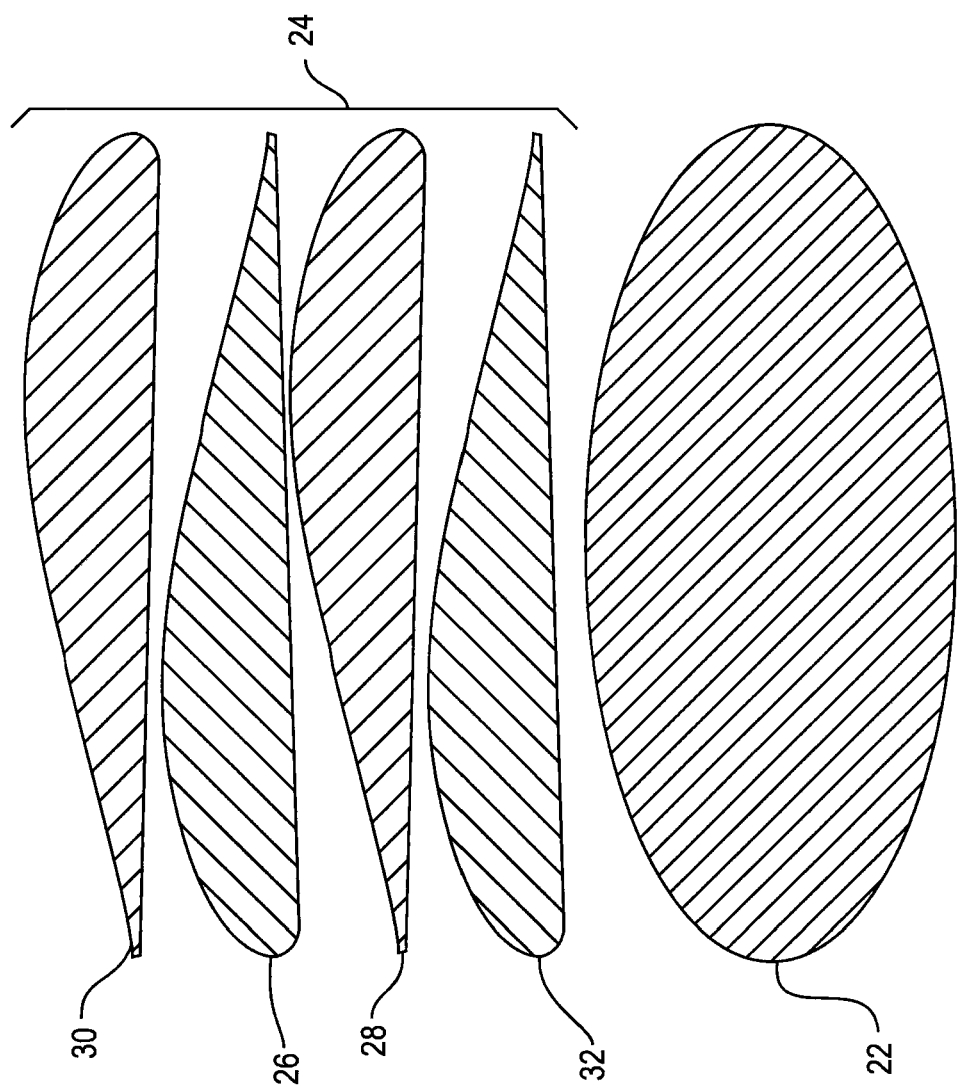
FIG. 3 is a schematic cross section of aircraft, with the wing shown in a stowed position.

FIGS. 2 and 3 show a front portion of aircraft 20 with wing 24 in a stowed position. As can be seen, outboard sections of wing 24 are rotated approximately 180 degrees, and inboard wing sections 26, 28 are rotated approximately 90 degrees, to form a stack having substantially the same lateral profile as fuselage 22.

As can be seen in FIG. 3, wing 24 is stacked above fuselage 22 in the stowed position, with right outboard wing section 32 directly above fuselage 22, right inboard wing section 28 directly above section 32, left outboard wing section 26 directly above section 28, and left outboard wing section 30 stowed at the top of the stack.

Figure 4:
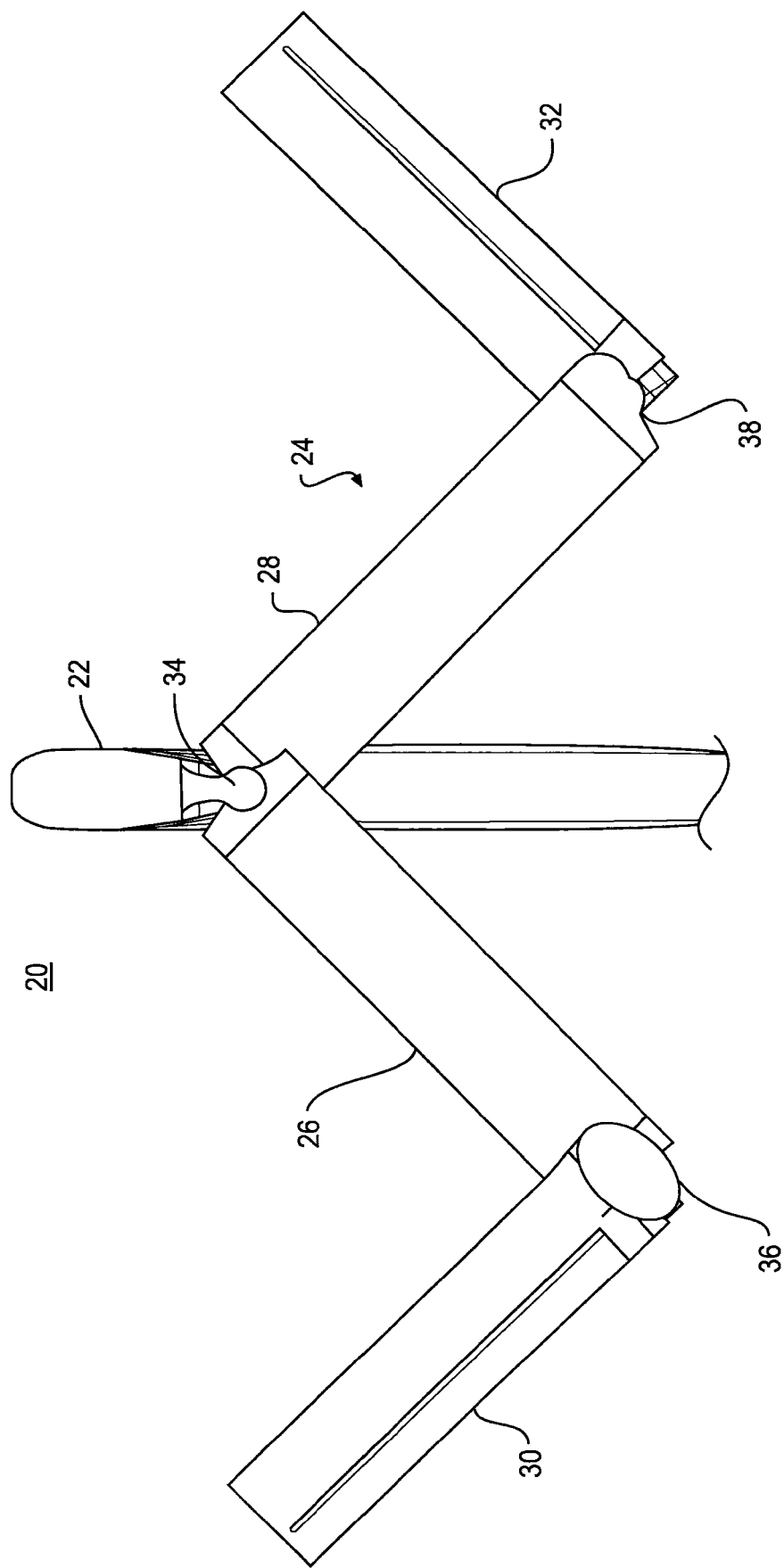
FIG. 4 is a top view of the aircraft of FIGS. 1-3, with the wing shown in a first intermediate stage of transition from a stowed to a deployed position.

FIG. 4 shows wing 24 transitioning from the stowed position of FIGS. 2 and 3 to the deployed position of FIG. 1. In some embodiments, wing sections 26, 28, 30, 32 stay behind the center of gravity of aircraft 20 at all stages of deployment. This may increase weathercock stability, and lessen the likelihood that aircraft 20 will lose control during a ballistic launch when transitioning from the stowed position to powered flight in the deployed position.

In FIG. 4, wing 24 is in a first partially deployed position. Centerline hinge 34 and outboard hinges 36, 38 may move at the same time such that both hinges close with synchronization. The hinges are rotational about vertical axes, and have a robust design under shear, bending, and torsion loads to minimize possibility of wing failure at designed wing loads.

Figure 5:
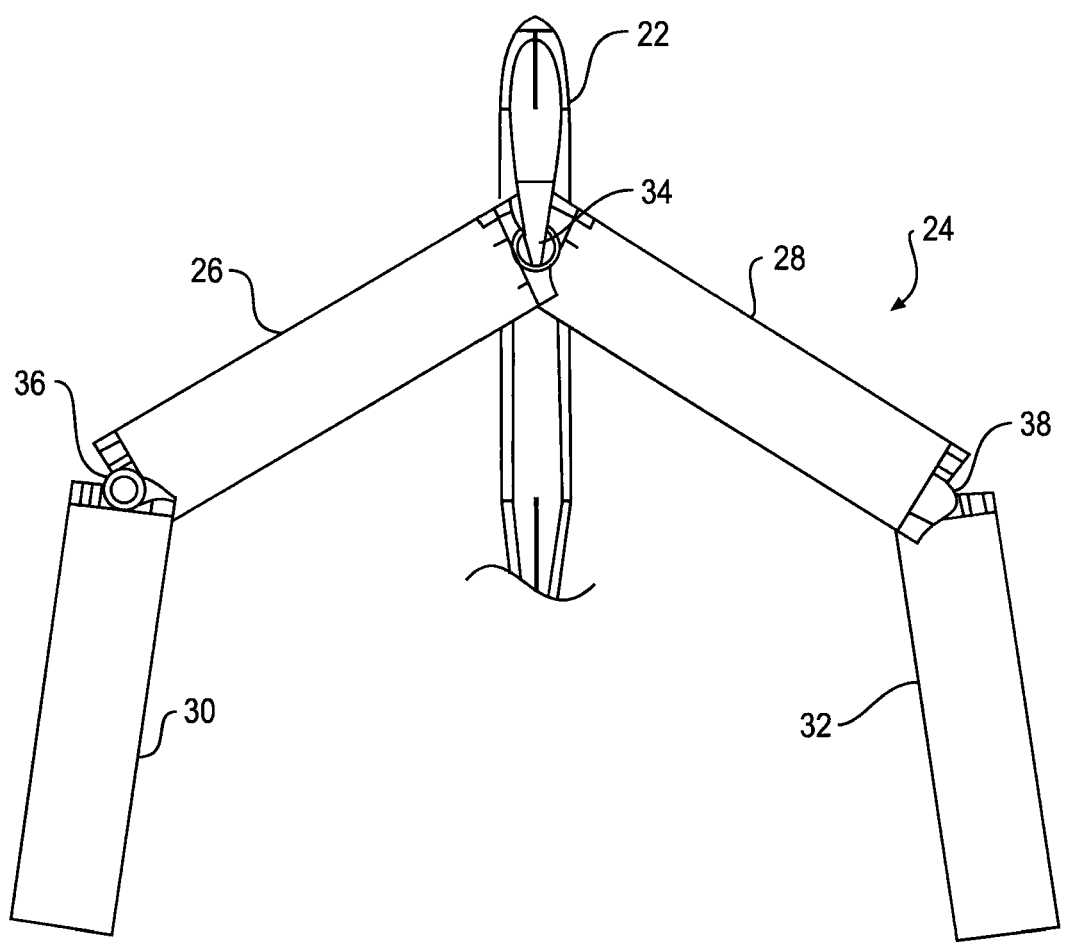
FIG. 5 is a top view of an alternative embodiment, showing an aircraft with a folding wing in a second intermediate stage of transition from a stowed to a deployed position, corresponding to the position shown in FIG. 4.

FIG. 5 shows an alternate embodiment. In the embodiment of FIG. 5, left inboard wing section 26 rotates clockwise about hinge 34, left outboard wing section rotates clockwise about hinge 36, right inboard wing section 28 rotates counter-clockwise about hinge 34, and right outboard wing section 32 rotates counter-clockwise about hinge 38, toward the deployed position.

Figure 6:
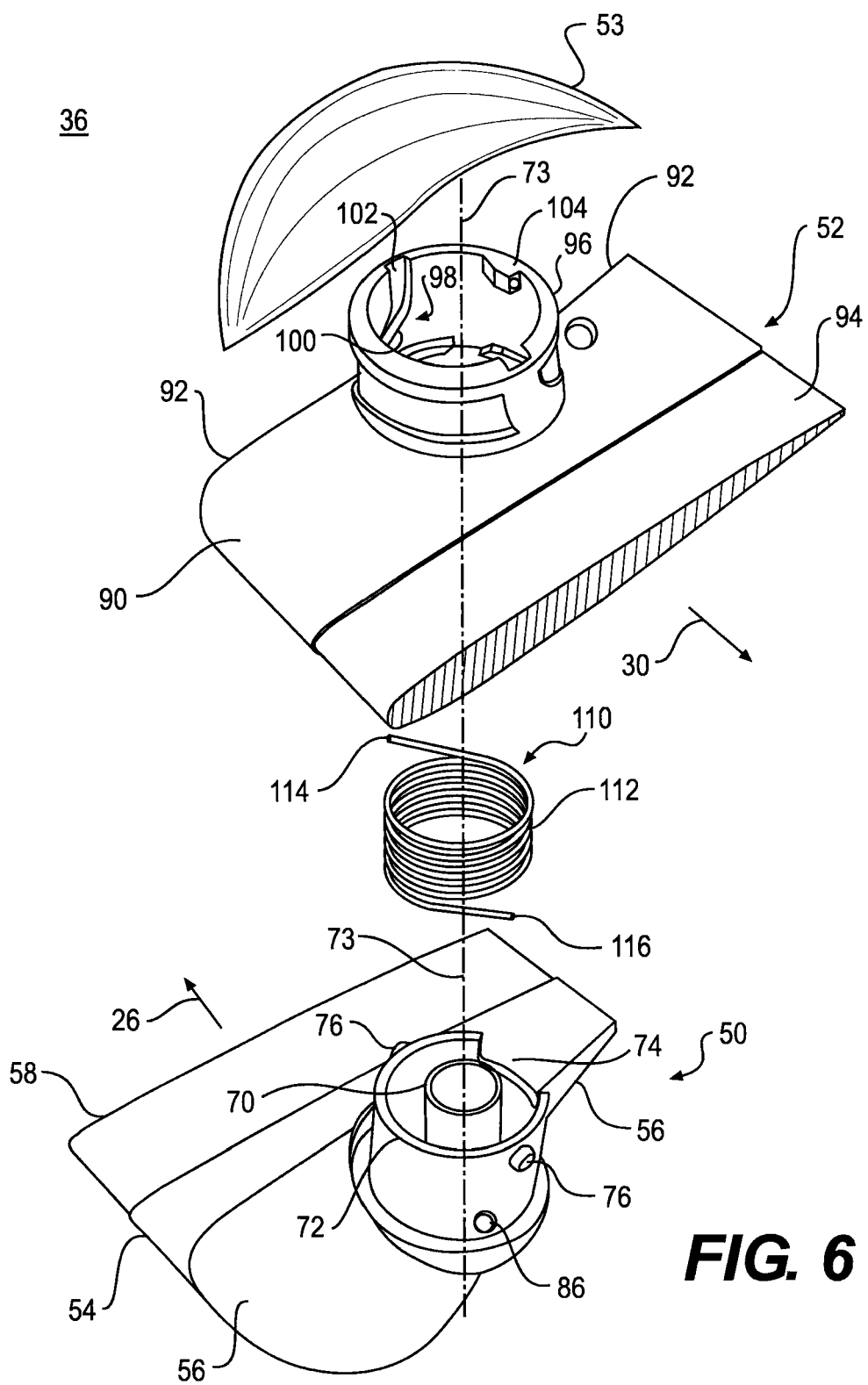
FIG. 6 is an exploded perspective view showing details of an outboard hinge of the wing shown in FIGS. 1-4.

Referring now to FIG. 6, components of outboard hinge 36 are shown in greater detail in an exploded perspective view, with wing 24 in the deployed position. The three main components of hinge 36 are an inboard hinge member 50, an outboard hinge member 52, and a fairing 53. Fairing 53 covers other components of outboard hinge 36 to reduce drag and improve aerodynamic efficiency.

Inboard hinge member 50 includes an airfoil portion 54, having a mating section 56 and a wing connection section 58. Mating section 56 fits together with and under a corresponding mating section 92 of outboard hinge member 52 when wing 24 is in the fully deployed position. Wing connection section 58 is permanently and integrally connected to inboard wing section 26, not fully shown in FIG. 6.

Inboard hinge member 50 further includes a cylindrical mandrel 70, extending upward in a vertical direction and defining a wing axis 73, and a cylindrical post 72, also extending vertically upward, and coaxial with and surrounding mandrel 70. Post 72 further includes a notch 74, a first guide surface in the form of a pair of pins 76 extending horizontally outward from post 72 and symmetrically disposed on opposite sides of post 72, and a first retention member in the form of a hole 86.

Outboard hinge member 52 includes an airfoil portion 90, a mating section 92, and a wing connection section 94. Mating section 92 fits together with and above corresponding mating surface 56 of inboard hinge member 50 when wing 24 is in the fully deployed position, such that airfoil portions 54 and 90 form a smooth continuous airfoil when wing 24 is in the deployed position. Wing connection section 94 is permanently and integrally connected to outboard wing section 30, not fully shown in FIG. 6. Inboard and outboard hinge members 50, 52 may have cross sections with identical airfoil shapes.

Outboard hinge member 52 includes a cylinder 96 extending vertically upward and positioned coaxially outside of post 72 when outboard hinge 36 is assembled. Cylinder 96 includes a second guide surface in the form of a pair of grooves, or tracks, 98 symmetrically formed on an inner surface of cylinder 96. Tracks 98 include helically inclined portions 100 spiraling upward from the lower end of cylinder 96 and terminating in substantially vertical sections 102, which extend to the upper end of cylinder 96. Cylinder 96 further includes a retention member 104.

Hinge 36 also includes a bias member, such as a spring 110. Spring 110 is coaxial with mandrel 70 and post 72, and positioned therebetween when hinge 36 is assembled. Spring 110 includes a coil section 112 and two leg portions 114 and 116.

Spring 110 is positioned coaxially over and around mandrel 70 with leg portions 114 and 116 respectively engaging cylinder 96 and post 72 in retention member 104 and hole 86. Cylinder 96 is positioned coaxially over and around post 72 and spring 110 such that pins 76 are positioned in vertical portions 102 of tracks 98. Spring 110 is under a moderate degree of tension, biasing outboard hinge member 52 in a counterclockwise direction, when wing 24 is in the deployed position.

To move wing 24 from the deployed position to the stowed position, outboard wing section 30, with outboard hinge member 52, is manually rotated clockwise about inboard hinge member 50. This causes tracks 98 to slide upward with respect to pins 76, in turn causing outboard hinge member 52 to translate axially upward along post 70 and driving spring 110 into even greater tension. Outboard wing section 30 is rotated until it assumes a position parallel to and directly above inboard wing section 26. Outboard wing section 30 is then in the stowed position with respect to inboard wing section 28. With inboard and outboard wing sections 26 and 30 so constrained, inboard and outboard wing sections 26 and 30 are then collectively rotated in a counter-clockwise direction about centerline hinge 34 in a manner to be described below in greater detail, and locked in the stowed position by any suitable locking means such as a locking pin or by insertion of aircraft 20 into a launching tube, not shown.

When the locking means is released and outboard wing section 30 is no longer constrained in a position directly above and parallel to inboard wing section 26, spring 110 applies rotational and translational force upon outboard hinge member 52, driving tracks 98 along pins 76 and causing outboard wing section 30 to rotate counter-clockwise and axially translate downward, respectively about and along post 72. This drives mating surface 92 downward and into contact with mating surface 56 so that inboard and outboard wing sections 30 and 26 form a smooth continuous airfoil, and outboard wing section 30 is in the deployed position. This position is locked in by the capturing of pins 76 in vertical sections 102 of tracks 98 to provide a rigid structure.

In some embodiments, lines perpendicular to the cross sections of inboard and outboard hinge members 50, 52, when wing 24 is in the stowed position, lie in first and second planes perpendicular to axis 73 about which hinge members 50, 52, rotate with respect to each other. When wing 24 is in the deployed position, the lines perpendicular to the cross sections of inboard and outboard hinge members 50, 52 are collinear.

Right outboard hinge 38 is similar in construction to left outboard hinge 36, with appropriate components provided in essentially an inverted mirror-image configuration to permit proper clearance between inboard wing sections 26 and 28 in the stowed position, and to achieve clockwise rotation of right outboard wing section 32 when wing 24 transitions from the stowed to the deployed position.

Pins 76 and tracks 98 are thus respective examples of a first and second guide surfaces cooperating to guide outboard hinge member 52 in translational movement along post 72 as outboard hinge member 52 rotates about post 72.

Figure 7:
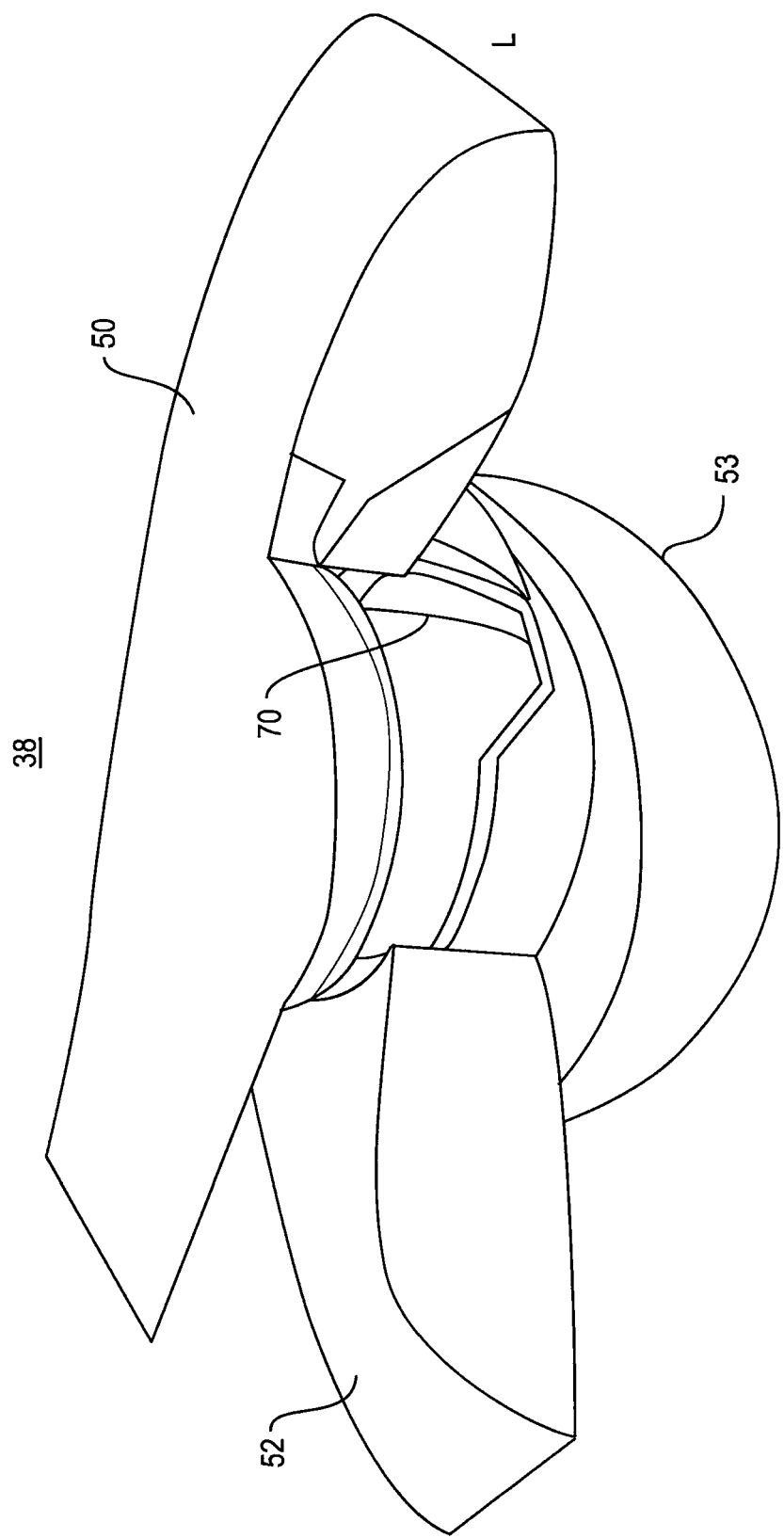
FIG. 7 is a perspective view showing an alternative embodiment of a hinge of the aircraft of FIGS. 1-3.

Another example of such first and second guide members is in an alternate embodiment of hinge 38 shown in FIG. 7, in which an inclined cam surface of inboard hinge member 50 of right outboard hinge 38 cooperates with a corresponding follower surface of outboard hinge member 52 to produce similar rotation and translation of outboard hinge member 52. Outboard wing section 32 may rotate approximately 150 of the total 180 degrees before any vertical motion occurs, due to the geometry of the guide surfaces. That is, a cam and follower design with a variable pitch helical path is used to dictate the exact motion of outboard wing section 32. Since spring 110 is also deformed axially when in the stowed position, it provides a force along the axis of spring 110 to pull up outboard wing section 32 to be flush with inboard wing section 28, assisting the motion of the cam and follower. The opposing sides of post 72 have a sloped interface to allow for the helical path of the hinge without interference. This sloped interface also allows for a transfer of loads from the outboard to the inboard wing section along the entire chord of the wing instead of relying solely on the hinge, making it very rigid in torsion and bending. This increases the structural integrity of the mating and decreases the structural load on the hinge.

Figure 8:
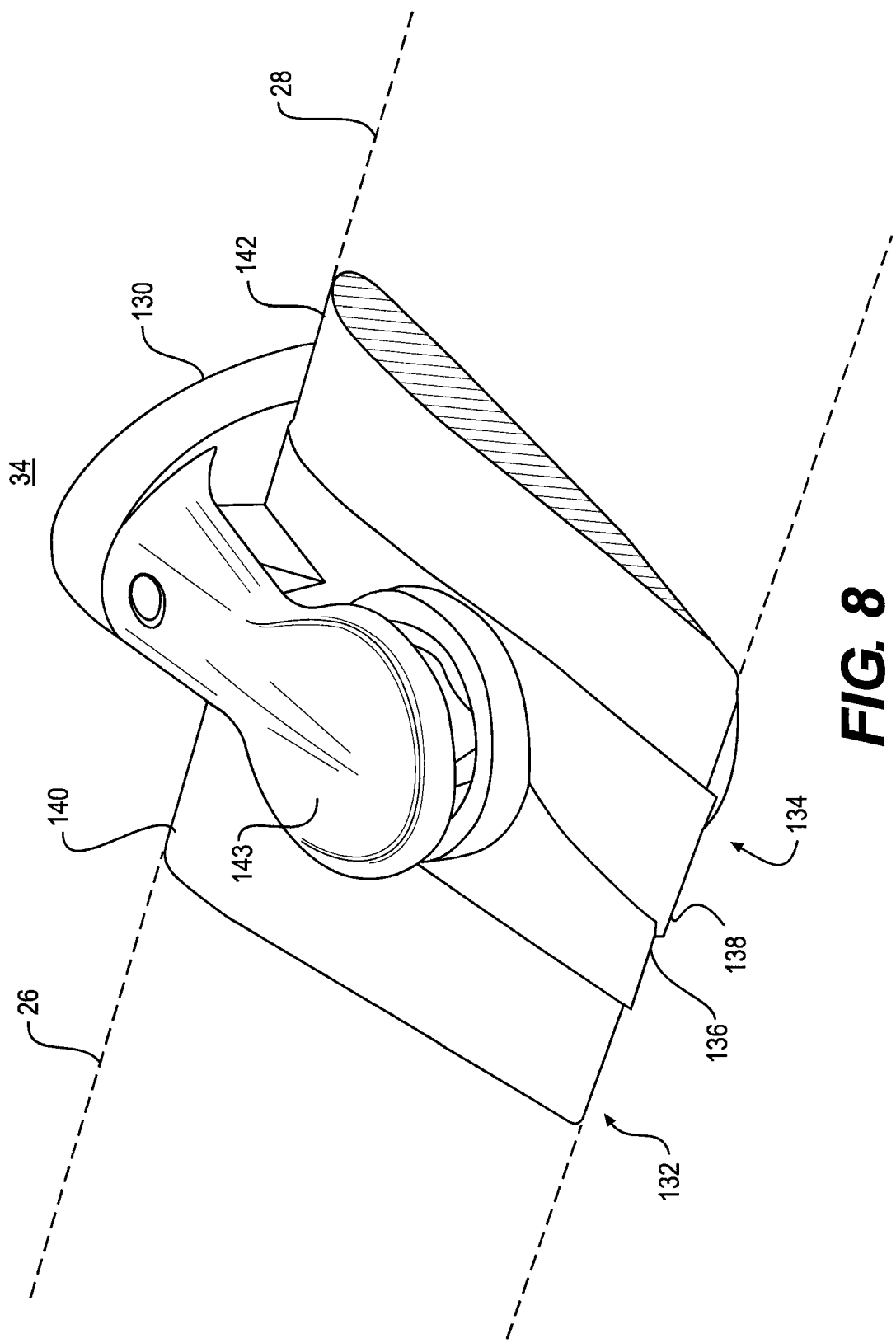
FIG. 8 is a detailed perspective view of a centerline hinge of the wing of FIGS. 1-6.

FIG. 8 shows centerline hinge 34 in greater detail. Centerline hinge 34 includes a mounting base 130, which is integral with, or fixedly attached to fuselage 22. Centerline hinge 34 also includes left and right centerline hinge members 132 and 134. Left and right centerline hinge members 132 and 134 respectively include left and right mating sections 136 and 138, and left and right connection portions 140, 142 respectively connected integrally to left and right inboard wing sections 26 and 28. Left and right centerline hinge members 132 and 134 rotate about a centerline mandrel, covered by a cap 143 and not visible in FIG. 10.

Figure 9:
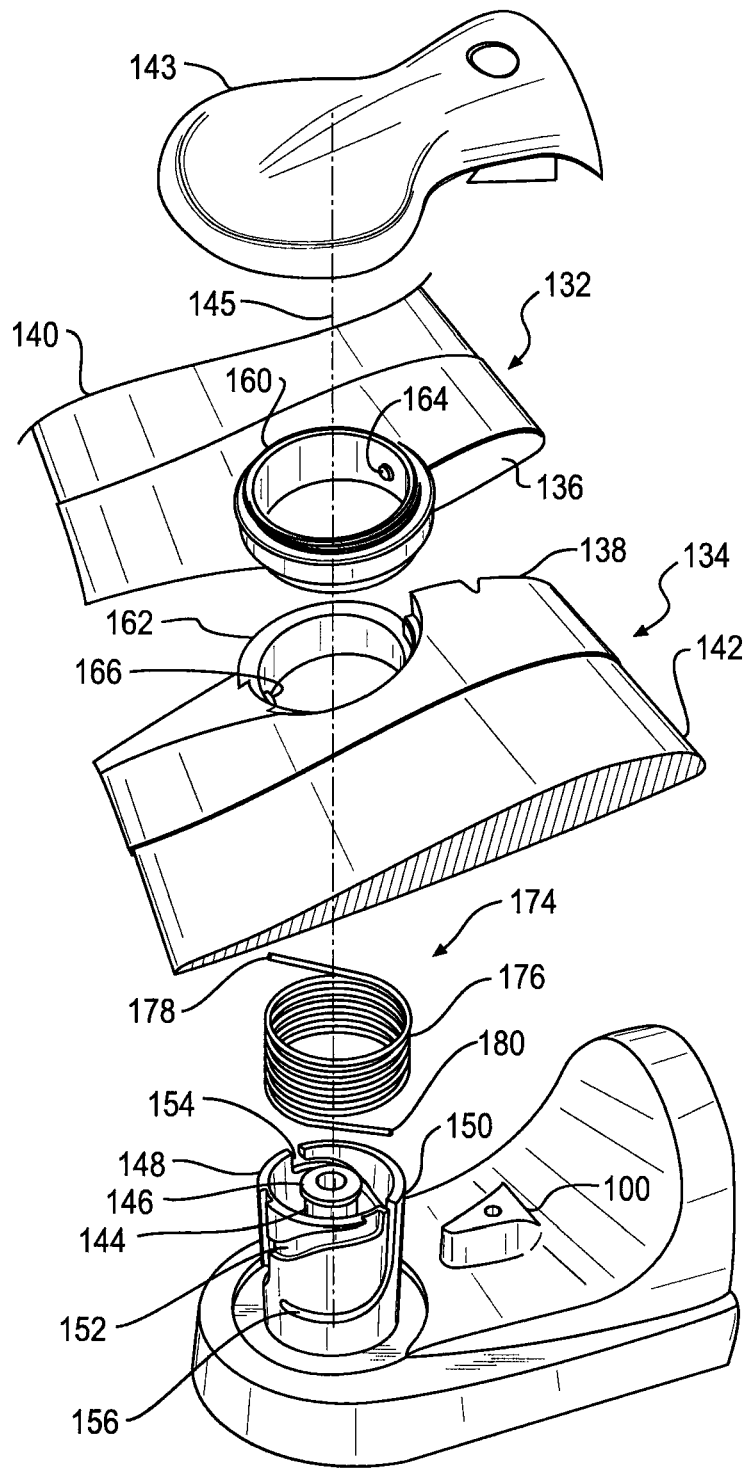
FIG. 9 is a detailed exploded perspective view of components of the hinge of FIG. 8.

FIG. 9 shows components of centerline hinge 34 in greater detail, in an exploded perspective view. A cylindrical centerline mandrel 144 is fixedly attached to mounting member 130 and has a mount axis 145 perpendicular to and intersecting with the centerline of aircraft 20. Mandrel 144 includes a lip 146, which is captured by a hole in the bottom of cap 143 and partially secures cap 143. Coaxial with and surrounding mandrel 144 is a cylindrical centerline post 148. Centerline post 148 includes left and right grooves, or tracks, 150, 152 formed on an outer surface of centerline post 148. Left and right slots 154, 156 are formed completely through the wall of centerline post 148.

Left and right centerline hinge members 132, 134 include left and right rings 160, 162 respectively formed therein. Left and right rings 160, 162 include left and right centerline pins 164, 166 formed on inner surfaces thereof, and extending radially inward. Rings 160, 162 also include retention members, such as left and right holes, not shown. Left and right rings 160, 162 are positioned one above the other so as to be rotatable about post 148, with pins 164, 166 engaging with tracks 150, 152.

Centerline hinge 34 includes a centerline bias member in the form of a spring 174 having a coil portion 176 and first and second legs 178, 180. Centerline spring 174 is positioned coaxial with and between mandrel 144 and centerline post 148, such that legs 176 and 178 extend through slots 154 and 156. Legs 176 and 178 engage rings 160 and 162 in holes, not shown.

When wing 24 is in the deployed position, spring 174 exerts moderate rotational force on left and right centerline hinge members 132, 134 in clockwise and counter-clockwise directions respectively, forcing mating sections 136, 138 into cooperation so as to form a smooth continuous airfoil surface in wing 24. A wedge on mounting member 130 may be provided to position left and right inboard wing sections to achieve a sweep angle when in the deployed position.

To place wing 24 in a stowed position, left and right outboard wing sections 30 and 32 are rotated so as to assume positions parallel to and vertically aligned with left and right inboard wing sections 26 and 28. The left and right aligned pairs are then manually rotated in respective counterclockwise and clockwise directions approximately 90 degrees, such that wing 24 assumes the stowed position as shown in FIGS. 2 and 3. In doing so, right centerline pin 166 follows track 150 so as to cause right centerline hinge member 134 to translate axially downward with respect to post 148, permitting all four wing sections to achieve the configuration shown in FIGS. 2 and 3. At the same time, such rotation is opposed by the action of spring 174 such that a significant rotational force is exerted upon left and right centerline hinge members in respective clockwise and counterclockwise directions. However, wing 24 is held in the stowed position by locking means, as described above.

When restraints upon wing 24 in the stowed position are removed, such as by launching aircraft 20, spring 174 exerts rotational force upon left and right centerline hinge members 132 and 134 and axial force on right centerline hinge member 134 to cause left and right centerline hinge members 132 and 134 to rotate respectively clockwise and counter-clockwise, and right centerline hinge member to translate upward, rapidly driving wing 24 from the stowed to the deployed position. Since spring 174 is deformed in an axial direction when wing 24 is in the stowed position, spring 174 also provides force along the axis of hinge 34 to assist pins 164, 166 and tracks 150 and 152 in providing axial translation of right centerline hinge member 134 to move upward and form a smooth continuous airfoil, in the deployed position, with left centerline hinge member 132. In certain applications, tracks 150 and 152 may have configurations such that both left and right centerline hinge members move axially along centerline post 148 when transitioning between the stowed and deployed positions.

The components of wing 24 may be constructed from any suitable materials. Depending on the application, such materials may include laser-sintered materials, injection-molded plastics, composite materials such as carbon fiber, and metals such as titanium or aluminum.

The disclosed embodiments may provide for automatic deployment of aircraft wings, which can also be folded for storage or launching, and may provide aerodynamic efficiency of the aircraft by allowing a continuous, rigid wing between the hinges with any typical airfoil shape. The disclosed embodiments may permit a larger wing aspect ratio for a given folded size than conventional designs, and may permit airfoil incidence at the wing root and dihedral. Furthermore, the disclosed embodiments may use few parts, stay rigid in the deployed position, and carry necessary loads with a minimal weight. Moreover, although the disclosed hinge apparatus has been described in connection with a folding wing, embodiments of the disclosed hinge apparatus may be also used with tail structures or canards.

The embodiments and aspects of the invention described above are not restrictive of the invention as claimed. Other embodiments consistent with the above-discussed features and principles are included in the scope of the present invention. In the foregoing description, various features are grouped together for purposes of streamlining the disclosure. This method of disclosure is not to be interpreted as reflecting an intention that the claimed invention requires more features than are expressly recited in each claim. Rather, as the following claims reflect, inventive aspects may relate to fewer than all features of any particular embodiment disclosed herein. It should be understood that, as used herein, the indefinite articles "a" and "an" mean "one or more" in open-ended claims containing the transitional phrase "comprising," "including," and/or "having."

What is claimed is:

1. A foldable wing for an aircraft, comprising:
a mounting member mountable on a fuselage of the aircraft and having a mount axis;
first and second inboard wing sections;
first and second outboard wing sections;
a centerline hinge assembly comprising:
first and second centerline hinge members, the first and second centerline hinge members being:
coupled to the mounting member;
respectively connected to the first and second inboard wing sections; and
movable in rotation about the mount axis and in translation along the mount axis, between stowed and deployed inboard wing section positions, with at least one of the first or second centerline hinge members being translationally moveable along the mount axis;
a centerline bias member applying rotational force to the first and second centerline hinge members and translational force to at least one of the first or second centerline hinge members, to bias the first and second centerline hinge members from the stowed inboard wing section position toward the deployed inboard wing section position; and
first and second wing hinge assemblies respectively comprising:
first and second inboard hinge members respectively connected to the first and second inboard wing sections;
first and second outboard hinge members, the first and second outboard hinge members being:
respectively connected to the first and second outboard wing sections;
respectively coupled to the first and second inboard hinge members; and
rotatably moveable about respective first and second wing axes between stowed and deployed outboard wing section positions, with at least one of the first or second inboard or outboard hinge members being translationally moveable along the wing axes;
first and second wing bias members, the first and second wing bias members:
being respectively coupled to the first and second inboard hinge members and to the first and second outboard hinge members; and
respectively applying, to the first and second inboard and outboard hinge members, rotational and translational force to bias the first and second outboard hinge members from the stowed outboard wing section position toward the deployed outboard wing section position.

2. A hinge apparatus for an aircraft with a foldable wing, comprising:
a first hinge member, comprising:
a first connection section connected to a first portion of the wing; and
a first mating section comprising a first guide surface;
a second hinge member, comprising:
a second connection section connected to a second portion of the wing; and
a second mating section coupled to the first mating section and movable, in rotation about an axis and in translation along the axis, between stowed and deployed positions, the second mating section comprising a second guide surface cooperating with the first guide surface to guide the second hinge member in translational movement along the axis as the second mating member rotates about the axis; and
a bias member applying rotational and translational force on the second hinge member, to bias the second mating section from the stowed position toward the deployed position.

3. The apparatus of claim 2, wherein the first and second hinge members have cross sections with identical airfoil shapes.

4. The apparatus of claim 3, wherein:
lines perpendicular to the cross sections of the first and second hinge members, when the first and second hinge members are in the stowed position, lie in first and second planes perpendicular to the axis; and
the lines perpendicular to the cross sections of the first and second hinge members, when the first and second hinge members are in the deployed position, are collinear.

5. The apparatus of claim 2, wherein:
the first guide surface comprises a pin; and
the second guide surface comprises a groove.

6. The apparatus of claim 2, wherein:
the first hinge member comprises:
  a first cylindrical member; and
  a second cylindrical member coaxial with and surrounding the first cylindrical member, the second cylindrical member comprising a projecting member extending radially outward from an outer surface of the second cylindrical member;
the second hinge member comprises a third cylindrical member having an inner surface and a groove formed in the inner surface; and
the third cylindrical member coaxially surrounds the second cylindrical member such that the projecting member engages with the groove.

7. The apparatus of claim 6, wherein the bias member comprises a coil spring coaxial with and positioned between the first and second cylindrical members.

8. The apparatus of claim 6, comprising a fairing covering the first, second, and third cylindrical members.

9. The apparatus of claim 2, comprising a mounting member, the mounting member having a cylindrical member attached thereto.

10. The apparatus of claim 9, wherein:
the first connection section comprises a first ring member rotatable about the cylindrical member and coaxial with the cylindrical member; and
the second connection section comprises a second ring member rotatable about the cylindrical member and coaxial with the cylindrical member.

11. A hinge apparatus for a folding wing, comprising:
inboard and outboard hinge members, the inboard and outboard hinge members:
  being respectively connectable to associated inboard and outboard wing sections;
  being coupled together; and
  being rotatably moveable about an axis between stowed and deployed wing positions,
    at least one of the inboard and outboard hinge members being translationally moveable along the axis between the stowed and the deployed positions; and
  a bias member coupled to the inboard and outboard hinge members and applying rotational and translational force to bias the inboard and outboard hinge members from the stowed wing position toward the deployed wing position.

* * * * *